United States Patent [19]

Sawasky

[11] 4,150,750
[45] Apr. 24, 1979

[54] APPARATUS FOR PROCESSING VEGETABLE MATERIAL

[75] Inventor: Herbert Sawasky, Massapequa, N.Y.

[73] Assignee: Heads Up Enterprises, Yonkers, N.Y.

[21] Appl. No.: 838,794

[22] Filed: Oct. 3, 1977

[51] Int. Cl.² .................... B07B 1/24; B02C 17/10
[52] U.S. Cl. .................................. 209/664; 209/933; 241/170
[58] Field of Search .................. 209/97, 98, 99, 101, 209/86, 288, 293, 286, 297, 299; 241/91, 170, 173, 174; 130/30 R, 30 H

[56] References Cited

U.S. PATENT DOCUMENTS

| 54,788 | 5/1866 | Spencer | 209/296 |
|---|---|---|---|
| 142,987 | 9/1873 | Brobston | 209/296 |
| 3,729,096 | 4/1973 | Fitzner et al. | 209/97 |

Primary Examiner—Robert J. Spar
Assistant Examiner—Edward M. Wacyra
Attorney, Agent, or Firm—Seidel, Gonda, Goldhammer & Panitch

[57] ABSTRACT

An apparatus for separating seeds and twigs from vegetable material is disclosed. The apparatus is comprised of an outer container which is divided into a first portion and a second portion by a wall attached to the first portion. A battery-operated electrical motor is attached to an inner surface of the first portion. A switch is provided for activating the motor. A rotatable shaft extends from the first portion through a hole in the wall into the second portion and a gear mechanism drivingly couples the rotatable shaft to the electric motor. A rotatable separating mechanism is fixedly secured to the rotatable shaft within the second portion and includes an apertured container into which vegetable material to be processed is placed. The second portion defines a collection chamber for receiving vegetable material from the apertured container after seeds and twigs have been separated fro the vegetable material. The first portion is removably secured to the second portion so that vegetable material can be removed from the collection chamber.

11 Claims, 3 Drawing Figures

APPARATUS FOR PROCESSING VEGETABLE MATERIAL

BACKGROUND OF THE INVENTION

The apparatus of the present invention relates to apparatus which breaks and separates usable leafy portions of vegetable material from the unusable portions such as stems and twigs. Today, numerous herbs, tobaccos and other forms of vegetable material may be purchased in a rough or fresh picked form. Also, home gardening has become very popular and numerous herbs and vegetables are grown by individuals in home or patio gardens.

Both rough form purchased herbs and fresh picked homegrown herbs generally are not in condition for immediate use because the usable leafy portions of the herbs are still attached or intermixed with twigs, seeds and the like. The leafy portions of the herbs may be separated from the stems and twigs either by hand or by use of a mechanical separating apparatus.

A separating apparatus suitable for use with herbs is disclosed in U.S. Pat. No. 3,729,096. The apparatus disclosed in this patent, however, has proven inadequate in several aspects. The slatted separating container is rotated manually and hence has a limited rotational speed. Also, the slats and agitation ball of this apparatus provide insufficient agitation of some herbs.

SUMMARY OF THE INVENTION

The present invention relates to an apparatus for separating seeds and twigs from vegetable material. The apparatus is comprised of an outer container which is divided into a first portion and a second portion by a wall attached to the first portion. A battery-operated electrical motor is attached to an inner surface of the first portion. A switch is provided for activating the motor. A rotatable shaft extends from the first portion through a hole in the wall into the second portion and a gear mechanism drivingly couples the rotatable shaft to the electric motor. A rotatable separating mechanism is fixedly secured to the rotatable shaft within the second portion and includes an apertured container into which vegetable material to be processed is placed. The second portion defines a collection chamber for receiving vegetable material from the apertured container after seeds and twigs have been separated from the vegetable material. The first portion is removably secured to the second portion so that vegetable material can be removed from the collection chamber.

In the preferred embodiment, the gear mechanism includes a driving gear which is fixedly secured to a drive shaft of the electric motor. A ring gear is fixedly secured to the rotatable shaft and is drivingly coupled to the driving gear. The electric motor preferably rotates at approximately 3000 rpm. A gear ratio of 14:1 between the driving gear and the ring gear is utilized. The rotatable shaft is thus rotated at approximately 200 rpm. This has been found to be especially suitable for processing certain herbs.

The first portion of the outer container is removably secured to the second portion of the outer container by a friction fit engagement between an annular flange extending from the first portion and the inner circumferential wall of the second portion. A pair of legs extend from the outer surface of the outer container and support the outer container along its longitudinal dimension. The apertured container preferably has a circumferential wall formed of a plurality of spaced slats. To aid in the agitation of material within the apertured container, a plurality of fins extend inwardly of the slats and a plurality of balls are secured to flexible members and are free to move within the apertured container. The apertured container also includes a removable top or cover so that unprocessed vegetable material may be placed therein.

It is an object of the invention to provide a convenient and easy to use apparatus for separating usable portions of vegetable material from the unusable portions.

It is another object of the invention to provide a compact and motorized separating apparatus.

Other objects will appear hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 3:
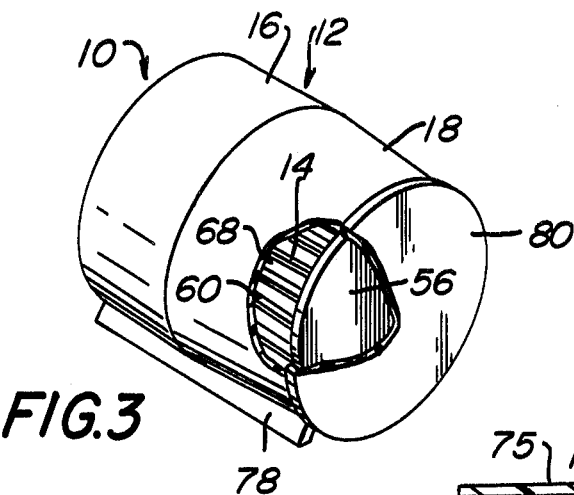
FIG. 3 is a perspective view of the apparatus of the present invention.
Figure 1:
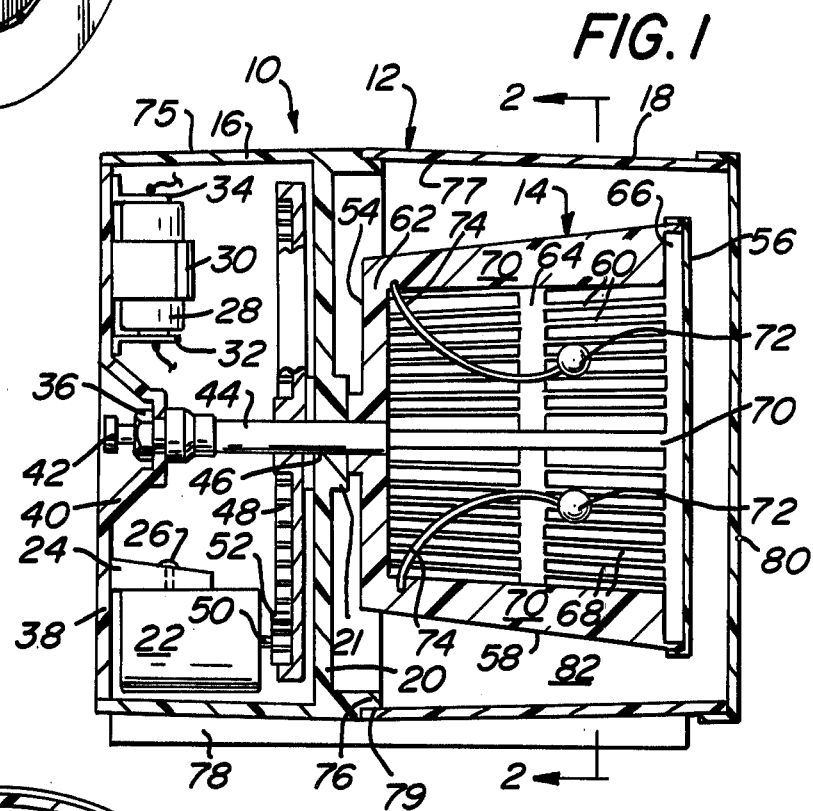
FIG. 1 is a cross-sectional view along the longitudinal dimension of the apparatus of the present invention.
Figure 2:
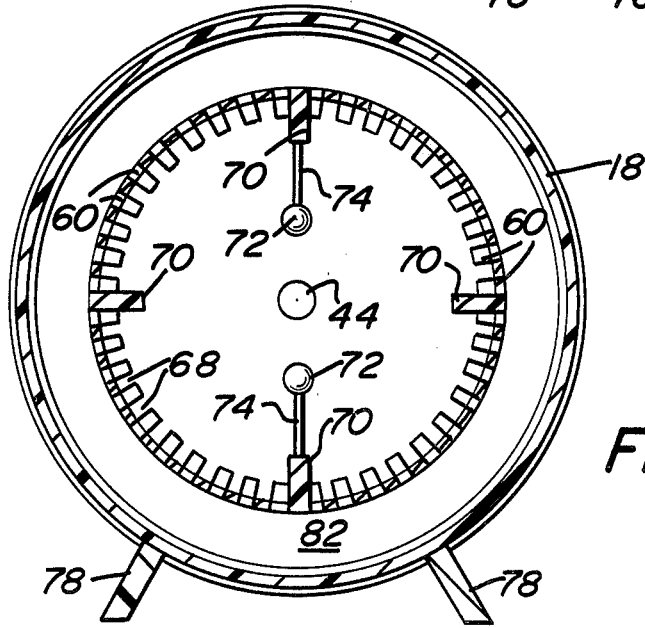
FIG. 2 is a cross-sectional view taken along lines 2—2 of FIG. 1.

Referring to the drawings in detail, wherein like numerals indicate like elements, there is shown in FIG. 1 an apparatus in accordance with the present invention designated generally as 10. The apparatus 10 includes an outer container 12 and an inner container 14. The outer container 12 is divided into a first portion 16 and a second portion 18. A wall 20 separates the first portion 16 from the second portion 18 and substantially encloses one end of the first portion 16. The wall 20 is attached to the inner surface of first portion 16 and may be made integral with the first portion 16 from a single piece of plastic material. In the preferred embodiment, the outer container is approximately 5 to 6 inches long and approximately 3½ to 5 inches in diameter. The outer container 12 and the inner container 14 are preferably made of a plastic material.

A battery-operated electric motor 22 is attached within the first portion by any suitable means such as bracket 24 and screw 26. A battery 28 is removably secured within the first portion 16 by a clamp 30. Terminals 32, 34 are wired to the motor 22 by way of a switch 36. In this manner, current can be selectively applied to the electric motor 22 by depressing the switch 36.

The first portion 16 has a removable bottom wall 38. The motor 22, the clamp 30 and the switch 36 are each secured to the removable end wall 38. Access to the motor 22, the clamp 30, the battery 28 and the switch 36 can thus be attained by removing the end wall 38 from the remainder of the first portion 16. The end wall 38 includes a recessed section 40 within which the switch 36 is attached. The switch 36 includes an on/off button 42 disposed within the recessed section 40. The outermost end of the on/off button 42 does not extend beyond the outer surface of end wall 38. In this manner, the apparatus 10 may be stored in an inoperative position with end wall 38 resting on a support surface and with the switch 36 thereby hidden from view.

A rotatable shaft 44 extends from the interior of first portion 16 through a hole 46 through wall 20 and into the interior of the second portion 18. The wall 20 has an enlarged cross-sectional area 21 through which the hole 46 extends. The circumferential wall of hole 46 provides the bearing surface for shaft 44. The inner container 14 is fixedly secured to the rotatable shaft 44 within the second portion 18. A ring gear 48 is fixedly secured to the rotatable shaft 44 within the interior of the first portion 16. An output shaft 50 is driven by the motor 22 and has a driving gear 52 fixedly attached to it. The driving gear 52 is drivingly coupled to the ring gear 48. In this manner, the motor 22 is placed in driving engagement with the inner container 14.

The inner container 14 has a first end 54 which is fixedly secured to the rotatable shaft 44. The other end of the inner container 14 is formed of a removable top 56. The inner container 14 has a circumferential wall 58 extending between the first end 54 and the removable top 56. The circumferential wall 58 is generally circular in configuration, but preferably in the form of a truncated cone with the smaller end of the cone adjacent the end 54. The wall 58 is comprised of a plurality of spaced slats 60. The slats 60 are interconnected by rings 62, 64 and 66. Spaces 68 between the slats 60 provide exit openings through which the usable separated leafy vegetable material can exit the inner container 14.

A plurality of fins 70 are attached to the inner surface of the wall 58. The fins 70 extend radially inward into the interior of inner container 14 beyond the innermost ends of the slats 60. A plurality of agitation or breaker balls 72 are tethered or attached within inner container 14. Each ball 72 is secured within the container 14 by a flexible member 74, such as cotton or plastic string.

An annular flange 76 is formed integrally with the first portion 16 and extends outwardly in an axial direction. The annular flange 76 is disposed inwardly of the outer cylindrical surface 75 of the first portion 16. The inner cylindrical surface 77 of second portion 18 is sized to friction fit against the outer circumferential surface 79 of annular flange 76. In this manner, a friction fit between the first portion 16 and the second portion 18 is accomplished. The diameter of the outer surface of both the first portion 16 and the second portion 18 at their juncture is the same so that a smooth exterior surface appears. A pair of legs 78 are attached to the outer surface of the outer container 12 along its longitudinal dimension. In its operative position, the apparatus 10 rests on legs 78 so that the longitudinal dimension of outer container 12 and the axis of rotation of shaft 44 are parallel to the supporting surface.

The apparatus is operated in the following manner. The first portion 16 is separated from the second portion 18 in order to allow access to the inner container 14. In an alternative embodiment, a removable top 80 can be provided and access to the inner container 14 can be accomplished by removing the top 80. Thereafter, the top 56 is removed from the inner container 14 and the vegetable matter to be processed is placed within the inner container 14. The top 56 is replaced onto the end of the inner container 14. Thereafter, the first portion 16 is connected to the second portion 18, or the top 80 is placed over the end of the first portion 18. The planar surface of end wall 38 allows the apparatus 10 to rest in an upright position during the loading of inner container 14.

The legs 78 of the apparatus 10 are thereafter placed upon the supporting surface. Button 42 of the switch 36 is depressed to activate the motor 22. The inner container 14 is thus rotated at approximately 200 rpm. The slats 60, the balls 72 and the fins 70 agitate and break the vegetable material apart. The spaces 68 between the slats 60 are so dimensioned that the usable leafy portions of the vegetable material, once they are separated from the twigs and seeds, pass through the spaces 68. However, the seeds and twigs will not fit through the spaces 68 and are thereby retained within the inner container. Using a spacing of between approximately 0.045 and 0.055 inches for the spaces 68 has been found suitable.

The usable leafy portion of the vegetable material is thus propelled into the interior of the second portion 18 which forms a collection chamber 82. The usable leafy material in collection chamber 82 can be retrieved by again separating the first portion 16 from the second portion 18 or in the alternative by removing the top 80.

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus for separating seeds and twigs from vegetable material comprising:
   an outer container;
   said outer container being divided into a first portion and a second portion;
   a wall member separating said first portion from said second portion;
   said wall member being attached to said first portion; motor means disposed within said first portion; an inner container disposed within said second portion;
   a rotatable shaft passing through a hole in said wall member and extending on either side of said wall member into said first and second portions;
   said inner container being secured to said rotatable shaft for rotation therewith;
   means drivingly coupling said rotatable shaft to said motor means;
   said inner container having one end secured to said rotatable shaft, a generally cylindrical body section and a removable top forming the other end whereby with said top removed, the vegetable material to be processed may be placed within said inner container;
   said body section being comprised of a plurality of spaced and interconnected slat members;
   a collection chamber formed by the space between the outer surface of said inner container and the inner surface of said second portion whereby upon rotation of said inner container the usable vegetable material is separated from the seeds and twigs and passes into said collection chamber; and
   means for gaining access to said collection chamber.

2. Apparatus in accordance with claim 1 including a plurality of fin members extending from the inner surface of said generally cylindrical body into the interior of said inner container and at least one ball attached to a flexible string and disposed for movement within said inner container whereby the fin members and the ball assist in the agitation and separating action of said apparatus.

3. Apparatus in accordance with claim 2 wherein said generally cylindrical body has a truncated cone configuration with the smaller end of said truncated cone being adjacent the end of the inner container secured to the rotatable shaft.

4. Apparatus in accordance with claim 1 wherein said outer container is generally cylindrical in configuration and said first portion is removably connected to said second portion by an interference fit means, said interference fit means providing said means for gaining access to said collection chamber.

5. Apparatus in accordance with claim 1 wherein said means for gaining access to said collection chamber is a removable top at one end of said second portion.

6. Apparatus in accordance with claim 1 wherein said outer container has a genrally cylindrical configuration, said rotatable shaft is generally coaxial with the longitudinal axis of said outer container and a pair of legs extend from the outer circumferential surface of said outer container whereby said rotatable shaft and the axis of rotation of said inner container can be placed generally parallel to a supporting surface.

7. Apparatus in accordance with claim 1 wherein said motor means includes a battery-operated motor attached within said first portion and a driving gear attached to an output shaft of said electric motor, and said coupling means includes a ring gear fixedly attached to said rotatable shaft and drivingly engaged with said driving gear.

8. Apparatus for separating seeds and twigs from vegetable material comprising:
an outer container separated into a first portion and a second portion with a wall attached to said first portion;
a battery-operated electric motor attached to an inner surface of said first portion;
switch means for activating said motor extending to the exterior of said outer container;
a rotatable shaft extending from said first portion through a hole in said wall into said second portion;
gear means drivingly coupling said rotatable shaft to said electric motor;
a rotatable separating means fixedly secured to said rotatable shaft within said second portion;
said rotatable separating means including an apertured container into which vegetable material to be processed is placed;
said second portion defining a collection chamber for receiving vegetable material from said apertured container after seeds and twigs have been separated from the vegetable material; and
means removably securing said first portion to said second portion whereby vegetable material can be removed from said collection chamber.

9. Apparatus in accordance with claim 8 wherein said gear means includes a driving gear fixedly secured to a drive shaft of said electric motor and a ring gear fixedly secured to said rotatable shaft, said ring gear being drivingly coupled to said driving gear.

10. Apparatus in accordance with claim 9 wherein said outer container is generally cylindrical and said means for removably securing the first portion to the second portion includes an annular flange integral with said first portion, said annular flange having an outer circumferential surface disposed inwardly of the outer circumferential surface of the remainder of said first portion, the inner surface of a cylindrical wall of said second portion frictionally engaging the outer circumferential surface of said annular flange to removably secure said first portion to said second portion.

11. Apparatus in accordance with claim 10 including a pair of legs extending from said outer container to support said outer container along its longitudinal dimension and wherein said apertured container includes a circumferential wall comprised of a plurality of spaced slats, a plurality of fins extending radially inward of said slats, and a plurality of balls secured to flexible members within said apertured container.

* * * * *